United States Patent Office 3,101,378
Patented Aug. 20, 1963

3,101,378
POLYHYDROXY NITRO COMPOUNDS
Gustave B. Linden, Pasadena, Calif., assignor to Aerojet-General Corporation, Azusa, Calif., a corporation of Ohio
No Drawing. Filed Dec. 12, 1956, Ser. No. 628,950
12 Claims. (Cl. 260—635)

This invention relates to new compositions of matter and a method for their preparation. More especially, this invention relates to polyhydroxy nitro compounds having the general formula:

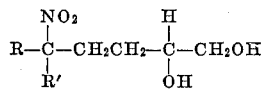

wherein R and R' are the same or different and represent nitro, hydrogen or alkyl groups.

This application is a continuation-in-part of my copending United States patent application Serial No. 390,415, filed November 5, 1953.

The new polyhydroxy nitro compounds of this invention readily react with diisocyanates, such as 3,3-dinitro-1,5-pentane diisocyanate, to produce high molecular weight polyurethane compounds having valuable use as solid, smokeless propellants. The preparation of such polyurethane compounds is more fully disclosed in assignee's copending application Serial No. 423,545, filed April 15, 1954, now abandoned.

The solid propellants thus produced can be used as a primary propulsion source in rocket-propelled vehicles, and can also be used as a propellant for artillery missiles. When used as the primary propulsion source for rocket vehicles, they can be conveniently ignited by a conventional igniter, as for example the igniter disclosed in assignee's copending patent application Serial No. 306,030, filed August 23, 1952, now Patent No. 3,000,312. The propellant is preferably cast in tubular form and restricted in the conventional manner within a relatively inert resin, such as a non-nitrated polyurethane foam or a polyester resin, and placed inside a chamber having one end open and leading into a conventional venturi rocket nozzle. Upon ignition, large quantities of gases are produced and exhausted through the nozzle creating propulsive force.

When used as a propellant for artillery shells, the polyurethane is simply substituted for the smokeless powder of conventional shells. Detonation is effected by impact. It is ordinarily preferred to use a sensitive primary explosive such as lead azide as the initiator for the polyurethane propellants to insure detonation. The shell is placed inside the chamber of a conventional artillery rifle. Upon detonation, large quantities of gases are produced causing the projectile portion of the shell to be ejected at high velocity from the barrel. The excellent ballistic reproducibility of the polyurethane propellants permits a high degree of accuracy in the firing of such weapons.

These compounds can in general be prepared by the reducing action of sodium borohydride on the carbonyl grouping of a nitro-containing keto-alcohol, in accordance with the general reaction scheme set forth below:

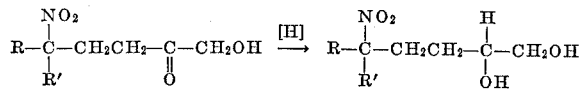

wherein R and R' are as identified above.

A variety of reducing agents, such as lithium aluminum hydride and aluminum isopropoxide are known to reduce ketones to their corresponding alcohols. However, they also exhibit a degrading effect upon nitro groupings, particularly those contained in polynitro compounds. While these conventional reducing agents might be employed under closely controlled conditions. I prefer to use sodium borohydride, the reducing action of which is limited to the carbonyl group.

The reduction of the nitro-containing keto-alcohol is usually conducted in the presence of an inert organic solvent such as methanol. The pH of the reaction mixture is maintained acidic and preferably below about 6.

The nitro-containing keto-alcohols employed in carrying out my invention can be prepared by the addition of labile hydrogen-containing nitro compounds to hydroxymethyl vinyl ketones. As a means of illustration, the following reaction scheme employing trinitromethane and hydroxymethyl vinyl ketone as representative reactants is presented:

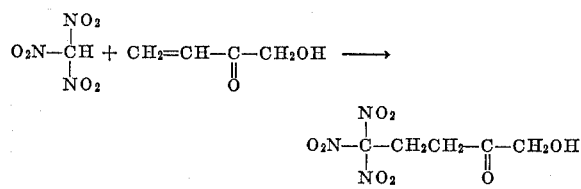

Such compounds as 5,5-dinitro-2-keto-1-hexanol, 5,5-dinitro-2-keto-1-heptanol, 5-nitro-2-keto-1-hexanol, etc., can also be prepared in this manner from appropriate starting materials.

The following examples are presented to more fully define my invention; however, they are presented merely as a means of illustration and are not intended to limit the scope of the invention.

EXAMPLE I

*Preparation of 5,5,5-Trinitro-1,2-Pentanediol*

A reactor fitted with a stirrer, pH electrodes, thermometer and two dropping funnels was charged with 500 g. (2.11 moles) 5,5,5-trinitro-2-keto-1-pentanol and 1800 ml. methanol. A cold solution of 80 g. (1.76 moles) sodium borohydride (84% pure) in 550 ml. water containing 2 ml. (10%) sodium hydroxide solution was added dropwise to the mixture. The addition of the sodium borohydride solution lasted for a period of one hour, during which the temperature of the mixture was maintained at 20°–25° C. with an ice bath and the pH at 3 to 4 by the concurrent dropwise addition of 6 N sulfuric acid. The reaction mixture was then filtered from the inorganic precipitate and evaporated under reduced pressure until an oil separated. The filtrate was then diluted with 500 ml. of water and extracted with ether. The ether solution was washed with a saturated salt solution, dried over sodium sulfate, and distilled. Methylene chloride was added to the ether distillation at about the same rate as the ether distilled off. The methylene chloride was then also allowed to distill. The remaining solvent was removed from the product under vacuum. The yield of crude glycol was 450 g. (89%), $n_D^{25}$ 1.4884. Analysis of the purified product is as follows:

*Analysis.*—Calc'd for $C_5H_9N_3O_8$: percent C, 25.11; percent H, 3.79; percent N, 17.57. Found: percent C, 24.97; percent H, 3.81; percent N, 18.08.

The heat of combustion was calculated to be 2730 cal./gram which is in close agreement with 2752 cal./gram heat of combustion found.

EXAMPLE II

*Preparation of 5,5-Dinitro-1,2-Hexanediol*

5,5-dinitro-2-keto-1-hexanol, 240 g. (1.16 moles), was reduced in a similar manner as that described for the production of trinitropentanediol using 42 g. (0.93 mole) sodium borohydride. The product was recovered from the methanolic reaction mixture by ether extraction and then crystallized from methylene chloride to yield 227 g. (94%) crude glycol, $n_D^{25}$ 1.4804. Analysis of the purified product is as follows:

*Analysis.*—Calc'd for $C_6H_{12}N_2O_6$: percent C, 34.61; percent H, 5.81; percent N, 13.46. Found: percent C, 34.27; percent H, 5.93; percent N, 13.23.

The heat of combustion was calculated to be 4001 cal./gram which agrees closely with 3985 cal./gram heat of combustion found.

It is apparent from the above given examples that a wide variety of nitro and polynitro glycols can be prepared in this manner, simply by selecting a suitable keto-alcohol and reducing it in the manner described. Illustrative of the ketones which can be used are such keto-alcohols as 5,5-dinitro-2-keto-1-octanol, 5-nitro-2-keto-1-pentanol, 5-nitro-5-methyl-2-keto-1-hexanol, etc. Reduction of these materials according to my invention produces the corresponding diols, namely, 5,5-dinitro-1,2-octanediol, 5-nitro-1,2-pentanediol, 5-nitro-5-methyl-1,2-hexanediol, etc.

My invention provides a new class of compounds which find valuable use in industry. They are particularly important in the preparation of smokeless propellant compositions. Furthermore, my invention provides a convenient method of preparing these compounds which is suitable for industrial application.

I claim:
1. A compound selected from the group consisting of 5,5,5-trinitro-1,2-pentanediol; 5,5-dinitro-1,2-hexanediol; 5,5-dinitro-1,2-octanediol; 5-nitro-1,2-pentanediol, and 5-nitro-5-methyl-1,2-hexanediol.
2. Process comprising reducing a compound selected from the group consisting of 5,5,5-trinitro-2-keto-1-pentanol; 5,5-dinitro-2-keto-1-hexanol; 5,5-dinitro-2-keto-1-octanol; 5-nitro-2-keto-1-pentanol, and 5-nitro-5-methyl-2-keto-1-hexanol with sodium borohydride in acid media.
3. 5,5,5-trinitro-1,2-pentanediol having the structural formula:

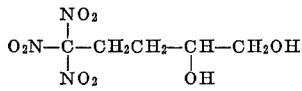

4. 5,5-dinitro-1,2-hexanediol having the structural formula:

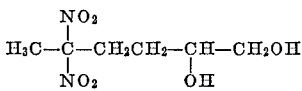

5. 5,5-dinitro-1,2-octanediol having the structural formula:

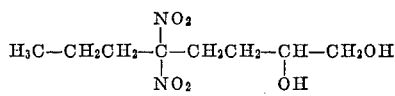

6. 5-nitro-1,2-pentanediol having the structural formula:

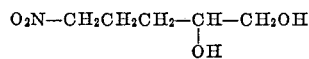

7. 5-nitro-5-methyl-1,2-hexanediol having the structural formula:

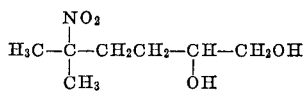

8. The method of preparing 5,5,5-trinitro-1,2-pentanediol which comprises reducing 5,5,5-trinitro-2-keto-1-pentanol with sodium borohydride in acid media.
9. The method of preparing 5,5-dinitro-1,2-hexanediol which comprises reducing 5,5-dinitro-2-keto-1-hexanol with sodium borohydride in acid media.
10. The method of preparing 5,5-dinitro-1,2-octanediol which comprises reducing 5,5-dinitro-2-keto-1-octanol with sodium borohydride in acid media.
11. The method of preparing 5-nitro-1,2-pentanediol which comprises reducing 5-nitro-2-keto-1-pentanol with sodium borohydride in acid media.
12. The method of preparing 5-nitro-5-methyl-1,2-hexanediol which comprises reducing 5-nitro-5-methyl-2-keto-1-hexanol with sodium borohydride in acid media.

References Cited in the file of this patent

UNITED STATES PATENTS

| | | |
|---|---|---|
| 2,079,403 | Hansley | May 4, 1937 |
| 2,212,151 | Coffman et al. | Aug. 20, 1940 |
| 2,327,961 | Degering | Aug. 24, 1943 |
| 2,522,959 | Plaut | Sept. 19, 1950 |

OTHER REFERENCES

Schechter et al.: J.A.C.S., vol. 74 (1952), pp. 3664–8.